UNITED STATES PATENT OFFICE.

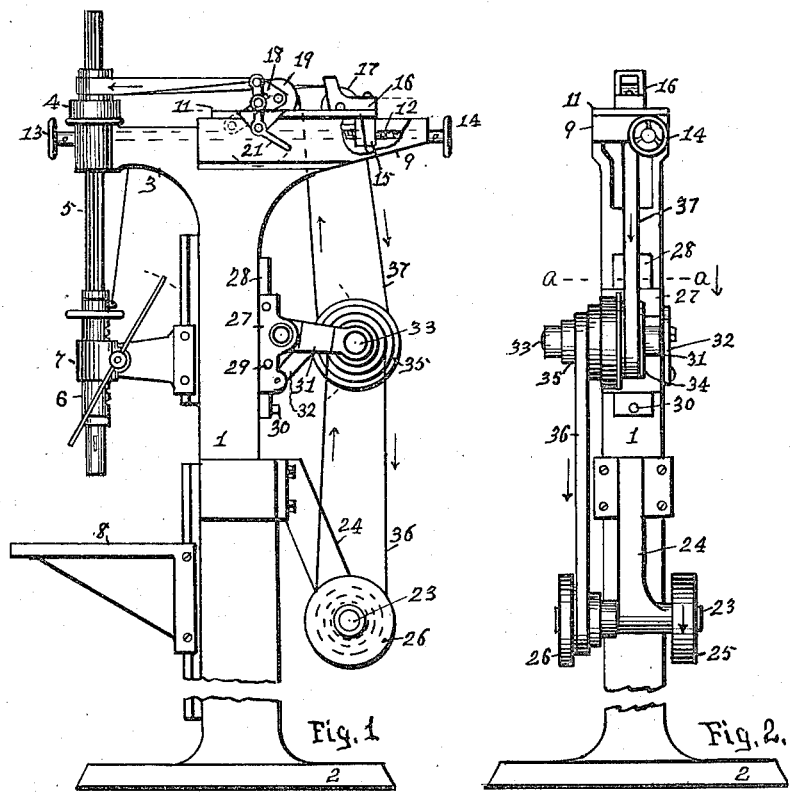

JOHN G. HEY, OF CINCINNATI, OHIO, ASSIGNOR TO THE CINCINNATI PULLEY MACHINERY COMPANY, OF CINCINNATI, OHIO, A CORPORATION OF OHIO.

BELT-GEARING.

1,173,189.  Specification of Letters Patent.  Patented Feb. 29, 1916.

Application filed July 12, 1912. Serial No. 709,039.

*To all whom it may concern:*

Be it known that I, JOHN G. HEY, a citizen of the United States, residing at Cincinnati, Ohio, have invented a new and useful Improvement in Belt-Gearing, of which the following is a specification.

My application relates to belt gearing of the general character of that shown in Patent Number 945,326 granted to me January 4, 1910, and adapted to use of sensitive drill presses or other suitable purposes.

The objects of my improvement are to provide two belts with intermediate pulleys which are automatically adjustable to compensate for any unevenness of the belts; to provide means for alining a quarter turn belt with the different faces of a stepped pulley; to provide means for simultaneously regulating the tension of tandem belts, and to provide simple, compact and durable construction and assemblage of the various parts for securing facility of operation combined with efficiency and accuracy of action. These objects may be attained in the following described manner as illustrated in the accompanying drawings, in which:

Figure 1 is the side elevation of an upright sensitive drill press provided with my improved belt gearing; Fig. 2 a rear elevation; Fig. 3 an elevation of a portion of the opposite side of Fig. 1, and Fig. 4 a section on the line $a$—$a$ of Fig. 2.

In the drawings, 1 represents the column of an upright drill press mounted on base 2 and formed with the top yoke 3; 4 a stepped pulley journaled in the top yoke, 5 the spindle splined therein, 6 the spindle sleeve adjustable in the sliding head 7, and 8 the table, all being constructed and arranged in the ordinary manner.

A rearward extension of the top yoke forms a guide 9 whereon the carriage 11 is slidably mounted. The hand screw 12 provided with front and rear hand wheels 13 and 14 serves to move and maintain the carriage in longitudinal adjustment by engagement with the nut 15 which depends therefrom. A housing 16 preferably swiveled on the rear portion of the carriage supports the return idle pulley 17 and the housing 18 hinged on the front portion of the carriage and movable in a vertical plane is provided with the delivery idle pulley 19. A hand lever 21 serves to move and maintain the housing with the delivery idler into a predetermined position of elevation as shown in Fig. 1. The driving shaft 23 journaled in the bracket 24 secured on the column is provided with the driving pulley 25 and also with the stepped pulley 26. A saddle 27 mounted on the guide 28 formed on the column may be secured in adjusted position by means of the clamping screws 29 or permitted to slide freely thereon and limited in its descent by contact with the stop 30. A yoke 31 pivotally secured on the saddle to swing in a vertical plane is provided with a slotted brace 32 for limiting its movement and which may serve also for securing it rigidly to the saddle if desired. A shaft 33 journaled in said yoke and provided with a pulley 34 and also with a stepped pulley 35 may be driven at different speeds from the stepped pulley 26 by means of the belt 36. A belt 37 extends from pulley 34 over the idlers 19 and 17 and by a quarter turn engages with the face of the stepped pulley 4 for driving the spindle.

In operation, the idler 19 may be adjusted in the proper vertical position and the carriage moved in a forward direction for shifting the belt 37 on the corresponding step of the spindle pulley when its tension may be properly regulated by moving the carriage with the idlers in a rearward direction. During this operation the brace limits the descent by gravity of the yoke with the pulley 34 from taking up too much of the slack thus provided in the belt 37. The forward movement of the carriage with the idlers permits the yoke with the stepped pulley 35 to descend by gravity for slackening the belt 36 that it may be easily shifted to different corresponding steps on the pulleys 26 and 35 for changing the speed of the spindle. Both belts 36 and 37 may be given the proper tension simultaneously by a rearward adjustment of the carriage with the idlers thereon.

It is preferable that the yoke with the pulleys thereon be permitted to reciprocate freely in a vertical plane either by the sliding of the saddle on the guide or by swinging on the saddle for responding to any unevenness in, or improper lacing of the belts which might cause momentary variation in the speed of the spindle to the detriment of its sensitive action.

Having fully described my improvement, which I claim as my invention and desire to secure by Letters Patent of the United States is:—

In a change speed belt gearing, the combination of a driving stepped pulley, a driven pulley, a vertically swinging bearing, an intermediate stepped and a plain pulley journaled to turn loose in unison therein and with their common axis above, and substantially in, a vertical plane extended through the axis of the driving pulley, a belt connecting the plain with the driven pulley, a slack driving belt depending from the intermediate stepped pulley around the driving pulley, and tighteners for both flights of the former belt, whereby the intermediate pulleys may be raised with the latter belt into operative engagement with the driving pulley.

JOHN G. HEY.

Witnesses:
ROBERT W. THOMPSON,
R. S. CARR.